(12) United States Patent
Han et al.

(10) Patent No.: US 10,375,740 B2
(45) Date of Patent: Aug. 6, 2019

(54) BEARER SETUP APPARATUS AND METHOD

(71) Applicant: HUAWEI TECHNOLOGIES CO., LTD., Shenzhen, Guangdong (CN)

(72) Inventors: Guanglin Han, Beijing (CN); Jian Zhang, Beijing (CN)

(73) Assignee: HUAWEI TECHNOLOGIES CO., LTD., Shenzhen, P.R. (CN)

( * ) Notice: Subject to any disclaimer, the term of this patent is extended or adjusted under 35 U.S.C. 154(b) by 0 days.

(21) Appl. No.: 15/363,309

(22) Filed: Nov. 29, 2016

(65) Prior Publication Data

US 2017/0079075 A1 Mar. 16, 2017

Related U.S. Application Data

(63) Continuation of application No. PCT/CN2014/078979, filed on May 30, 2014.

(51) Int. Cl.
*H04W 36/00* (2009.01)
*H04W 36/12* (2009.01)
(Continued)

(52) U.S. Cl.
CPC .......... *H04W 76/10* (2018.02); *H04W 48/12* (2013.01); *H04W 72/0486* (2013.01); *H04W 72/085* (2013.01)

(58) Field of Classification Search
CPC . H04W 36/12; H04W 36/0055; H04W 72/04; H04W 76/02; H04W 36/00; H04W 76/10
(Continued)

(56) References Cited

U.S. PATENT DOCUMENTS 9,380,618 B2 * 6/2016 Peng ................. H04W 72/0406
2010/0318670 A1 12/2010 Al-Shalash et al.
(Continued)

FOREIGN PATENT DOCUMENTS

CN 101064635 10/2007
CN 101932034 12/2010
(Continued)

OTHER PUBLICATIONS

International Search Report dated Feb. 27, 2015 in corresponding International Application No. PCT/CN2014/078979.
(Continued)

*Primary Examiner* — William D Cumming
(74) *Attorney, Agent, or Firm* — Staas & Halsey LLP

(57) ABSTRACT

Embodiments of the present invention provide a bearer setup apparatus and method. A base station includes: a receiving module, configured to receive a bearer setup request message sent by a mobility management entity MME, where the bearer setup request message is used to request to set up a bearer of a service, the bearer setup request message includes first experience quality information, the first experience quality information is an experience level related to the service, and the service is a service initiated by user equipment UE or a service initiated by a network-side device; and a processing module, configured to: determine, according to a current load status and the first experience quality information, whether the base station accepts the bearer setup request message, and if the base station accepts the bearer setup request message, set up a first bearer that is used to transmit the service.

8 Claims, 7 Drawing Sheets

(51) Int. Cl.
*H04W 76/10* (2018.01)
*H04W 72/04* (2009.01)
*H04W 48/12* (2009.01)
*H04W 72/08* (2009.01)

(58) Field of Classification Search
USPC .................................. 455/452.2; 370/331
See application file for complete search history.

(56) References Cited

U.S. PATENT DOCUMENTS

| | | | |
|---|---|---|---|
| 2012/0087330 A1 | 4/2012 | Zhu et al. | |
| 2013/0170347 A1 | 7/2013 | Zhang et al. | |
| 2013/0194919 A1 | 8/2013 | Garavaglia et al. | |
| 2013/0286982 A1 | 10/2013 | Chen et al. | |
| 2013/0287012 A1 | 10/2013 | Pragada et al. | |
| 2015/0094073 A1* | 4/2015 | Peng | H04W 72/0406 455/450 |
| 2016/0037411 A1* | 2/2016 | Franklin | H04W 36/12 370/331 |
| 2016/0323805 A1* | 11/2016 | Ryu | H04W 36/0055 |
| 2017/0079075 A1* | 3/2017 | Han | H04W 76/10 |

FOREIGN PATENT DOCUMENTS

| | | |
|---|---|---|
| CN | 102547610 | 7/2012 |
| JP | 2015-507439 | 3/2015 |
| JP | 2015-513829 | 5/2015 |
| JP | 2015-520556 | 7/2015 |
| WO | 2013/085438 | 6/2013 |
| WO | 2013/116746 A1 | 8/2013 |
| WO | 2013/123467 | 8/2013 |
| WO | 2013123467 A1 | 8/2013 |
| WO | 2013/163595 A2 | 10/2013 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 v12.4.0 (Mar. 2014), 302 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); (Release 12), 3GPP TS 36.300 v12.1.0 (Mar. 2014), 209 pages.
Chinese Search Report dated Feb. 27, 2015 in corresponding International Patent Application No. PCT/CN2014/078979, 4 pages.
Extended European Search Report dated May 30, 2017 in corresponding European Patent Application No. 14893476.3, 10 pages.
Japanese Office Action dated Feb. 13, 2018, in corresponding Japanese Patent Application No. 2017-514751, 7 pgs.
Communication Pursuant to Article 94(3) EPC, dated Mar. 28, 2019, in European Application No. 14893476.3 (9 pp.).

* cited by examiner

BEARER SETUP APPARATUS AND METHOD

CROSS-REFERENCE TO RELATED APPLICATIONS

This application is a continuation of International Application No. PCT/CN2014/078979, filed on May 30, 2014, the disclosure of which is hereby incorporated by reference in its entirety.

TECHNICAL FIELD

Embodiments of the present invention relate to the field of communications technologies, and in particular, to a bearer setup apparatus and method.

BACKGROUND

When user equipment (UE for short) requests a new service from a network-side device, the network-side device determines quality of service (QoS for short) description according to the service requested by the UE. The QoS description includes a bit (bit) rate, service delay information, and the like. The network-side device generates a QoS description set according to the QoS description.

In actual application, when a default bearer cannot provide QoS corresponding to the service requested by the UE, a bearer needs to be set up between the UE and the network-side device, to transmit the requested service. In the prior art, in a bearer setup process, the network-side device needs to, based on the QoS description set of the service, set up the bearer, to ensure that the established bearer can meet a QoS requirement of the service requested by the UE.

However, although bearer setup in the prior art may ensure the QoS requirement, a problem may occur: Actual experience of a user for the service is still poor even though the QoS requirement of the service is ensured.

SUMMARY

The present invention provides a bearer setup apparatus and method, which can set up a bearer for a service to improve user experience.

According to a first aspect, a base station is provided, including:

a receiving module, configured to receive a bearer setup request message sent by a mobility management entity MME, where the bearer setup request message is used to request to set up a bearer of a service, the bearer setup request message includes first experience quality information, the first experience quality information is an experience level related to the service, and the service is a service initiated by user equipment UE or a service initiated by a network-side device; and a processing module, configured to: determine, according to a current load status and the first experience quality information, whether the base station accepts the bearer setup request message, and if the base station accepts the bearer setup request message, set up a first bearer that is used to transmit the service.

According to the first aspect, in a first possible implementation manner, the processing module is further configured to: determine, according to the first experience quality information, a network resource required by a bearer corresponding to the first experience quality information, and determine, according to the current load status, a network resource that can be currently provided; and if the network resource that can be currently provided is greater than or equal to the network resource required by the bearer corresponding to the first experience quality information, determine that the base station accepts the bearer setup request message; or if the network resource that can be currently provided is less than the network resource required by the bearer corresponding to the first experience quality information, determine that the base station does not accept the bearer setup request message.

According to the first aspect or the first possible implementation manner of the first aspect, in a second possible implementation manner, the base station further includes:

a sending module, configured to send a first radio resource control RRC connection configuration message to the UE, to instruct the UE to configure a transmission channel according to the first RRC connection configuration message, where the first RRC connection configuration message includes the first experience quality information; where the receiving module is further configured to receive a first RRC connection configuration complete message sent by the UE after the UE completes configuration of the transmission channel; and the sending module is further configured to send a first bearer setup complete response message to the MME.

According to any one of the first aspect to the second possible implementation manner of the first aspect, in a third possible implementation manner, the first experience quality information includes any one of the following:

an experience level of the first bearer; or an experience level required for transmitting the service by using the first bearer.

According to any one of the first aspect to the third possible implementation manner of the first aspect, in a fourth possible implementation manner, the first experience quality information is an experience level determined by the network-side device according to a subscribed experience level of the UE and an experience level required for transmitting the service.

According to any one of the first aspect to the fourth possible implementation manner of the first aspect, in a fifth possible implementation manner, the sending module is further configured to: if the base station does not accept the bearer setup request message, send an experience assurance negotiation request message to the MME, where the experience assurance negotiation request message includes second experience quality information currently supported by the base station, and the second experience quality information is an experience level determined by the base station according to a quality of service range supported by the base station;

the receiving module is further configured to: if the MME confirms that the second experience quality information meets the first experience quality information, receive an experience assurance negotiation response message sent by the MME; and the processing module is further configured to set up a second bearer that is used to transmit the service.

According to the fifth possible implementation manner of the first aspect, in a sixth possible implementation manner, the sending module is further configured to send a second RRC connection configuration message to the UE, to instruct the UE to configure the transmission channel according to the second RRC connection configuration message, where the second RRC connection configuration message includes the second experience quality information;

the receiving module is further configured to receive a second RRC connection configuration complete message sent by the UE after the UE completes configuration of the transmission channel; and the sending module is further configured to send a second bearer setup complete response message to the MME.

According to the fifth or the sixth possible implementation manner of the first aspect, in a seventh possible implementation manner, the second experience quality information includes any one of the following:

an experience level of the second bearer; or an experience level required for transmitting the service by using the second bearer.

According to a second aspect, an embodiment of the present invention further provides an MME, including:

a receiving module, configured to receive a bearer setup request message sent by a packet data network gateway PGW, where the bearer setup request message is used to request to set up a bearer of a service, the bearer setup request message includes first experience quality information, the first experience quality information is an experience level related to the service, and the service is a service initiated by UE or a service initiated by a network-side device; and a sending module, configured to send the bearer setup request message to a base station, so that if the base station accepts the bearer setup request message, the base station sets up a first bearer that is used to transmit the service, where the receiving module is further configured to receive a bearer setup complete response message sent by the base station.

According to the second aspect, in a first possible implementation manner, the first experience quality information includes any one of the following:

an experience level of the first bearer; or an experience level required for transmitting the service by using the first bearer.

According to the second aspect or the first possible implementation manner of the second aspect, in a second possible implementation manner, the first experience quality information is an experience level determined by the network-side device according to a subscribed experience level of the UE and an experience level required for transmitting the service.

According to any one of the second aspect to the second possible implementation manner of the second aspect, in a third possible implementation manner, the receiving module is further configured to: if the base station does not accept the bearer setup request message, receive an experience assurance negotiation request message sent by the base station, where the experience assurance negotiation request message includes second experience quality information currently supported by the base station, and the second experience quality information is an experience level determined by the base station according to a quality of service range supported by the base station;

correspondingly, the MME further includes:

a processing module, configured to: if the second experience quality information meets the first experience quality information, determine that a second bearer that the base station requests to set up may be set up; and the sending module is further configured to send an experience assurance negotiation response message to the base station, to instruct the base station to set up the second bearer for transmitting the service.

According to the third possible implementation manner of the second aspect, in a fourth possible implementation manner, the second experience quality information includes any one of the following:

an experience level of the second bearer; or an experience level required for transmitting the service by using the second bearer.

According to the fourth possible implementation manner of the second aspect, in a fifth possible implementation manner, the processing module is further configured to: if the experience level included in the second experience quality information falls within a range of the experience level included in the first experience quality information, determine that the MME may set up the second bearer that the base station requests to set up.

According to a third aspect, an embodiment of the present invention further provides UE, including:

a receiving module, configured to receive an RRC connection configuration message sent by a base station, where the RRC connection configuration message is a message sent by the base station when the base station sets up a bearer, the RRC connection configuration message includes experience quality information, the experience quality information is an experience level related to a service that the UE needs to transmit, and the service is a service initiated by the UE, or a service initiated by a network-side device;

a processing module, configured to configure a transmission channel according to the RRC connection configuration message; and a sending module, configured to send an RRC connection configuration complete message to the base station, to indicate that a bearer between the base station and the UE has been set up.

According to the third aspect, in a first possible implementation manner of the third aspect, the RRC connection configuration message is a first RRC connection configuration message that is sent to the UE by the base station when the base station accepts a bearer setup request message sent by an MME, the first RRC connection configuration message includes first experience quality information, and the established bearer is a first bearer.

According to the third aspect or the first possible implementation manner of the third aspect, in a second possible implementation manner, the first experience quality information includes any one of the following:

an experience level of the first bearer; or an experience level required for transmitting the service by using the first bearer.

According to any one of the third aspect to the second possible implementation manner of the third aspect, in a third possible implementation manner, the first experience quality information is an experience level determined by the network-side device according to a subscribed experience level of the UE and an experience level required for transmitting the service.

According to the third aspect, in a fourth possible implementation manner of the third aspect, the RRC connection configuration message is a second RRC connection configuration message that is sent to the UE by the base station when the base station does not accept a bearer setup request message sent by an MME, the second RRC connection configuration message includes second experience quality information, and the established bearer is a second bearer; and the second experience quality information is experience quality information determined by the base station according to a quality of service range supported by the base station.

According to the fourth possible implementation manner of the third aspect, in a fifth possible implementation manner, the second experience quality information includes any one of the following:

an experience level of the second bearer; or an experience level required for transmitting the service by using the second bearer.

According to a fourth aspect, an embodiment of the present invention further provides a bearer setup method, including:

receiving, by a base station, a bearer setup request message sent by an MME, where the bearer setup request message is used to request to set up a bearer of a service, the bearer setup request message includes first experience quality information, the first experience quality information is an experience level related to the service, and the service is a service initiated by UE or a service initiated by a network-side device;

determining, by the base station according to a current load status and the first experience quality information, whether to accept the bearer setup request message; and if the base station accepts the bearer setup request message, setting up, by the base station, a first bearer that is used to transmit the service.

According to the fourth aspect, in a first possible implementation manner, the determining, by the base station according to a current load status and the first experience quality information, whether to accept the bearer setup request message includes:

determining, by the base station according to the first experience quality information, a network resource required by a bearer corresponding to the first experience quality information, and determining, according to the current load status, a network resource that can be currently provided; and if the network resource that can be currently provided is greater than or equal to the network resource required by the bearer corresponding to the first experience quality information, determining, by the base station, to accept the bearer setup request message; or if the network resource that can be currently provided is less than the network resource required by the bearer corresponding to the first experience quality information, determining, by the base station, not to accept the bearer setup request message.

According to the fourth aspect or the first possible implementation manner of the fourth aspect, in a second possible implementation manner, the setting up, by the base station, a first bearer that is used to transmit the service includes:

sending, by the base station, a first RRC connection configuration message to the UE, to instruct the UE to configure a transmission channel according to the first RRC connection configuration message, where the first RRC connection configuration message includes the first experience quality information;

receiving, by the base station, a first RRC connection configuration complete message sent by the UE after the UE completes configuration of the transmission channel; and sending, by the base station, a first bearer setup complete response message to the MME.

According to any one of the fourth aspect to the second possible implementation manner of the fourth aspect, in a third possible implementation manner, the first experience quality information includes any one of the following:

an experience level of the first bearer; or an experience level required for transmitting the service by using the first bearer.

According to any one of the fourth aspect to the third possible implementation manner of the fourth aspect, in a fourth possible implementation manner, the first experience quality information is an experience level determined by the network-side device according to a subscribed experience level of the UE and an experience level required for transmitting the service.

According to any one of the fourth aspect to the fourth possible implementation manner of the fourth aspect, in a fifth possible implementation manner, the method further includes:

if the base station does not accept the bearer setup request message, sending, by the base station, an experience assurance negotiation request message to the MME, where the experience assurance negotiation request message includes second experience quality information currently supported by the base station, and the second experience quality information is an experience level determined by the base station according to a quality of service range supported by the base station;

if the MME confirms that the second experience quality information meets the first experience quality information, receiving, by the base station, an experience assurance negotiation response message sent by the MME; and setting up, by the base station, a second bearer that is used to transmit the service.

According to the fifth possible implementation manner of the fourth aspect, in a sixth possible implementation manner, the setting up, by the base station, a second bearer that is used to transmit the service includes:

sending, by the base station, a second RRC connection configuration message to the UE, to instruct the UE to configure the transmission channel according to the second RRC connection configuration message, where the second RRC connection configuration message includes the second experience quality information;

receiving, by the base station, a second RRC connection configuration complete message sent by the UE after the UE completes configuration of the transmission channel; and sending, by the base station, a second bearer setup complete response message to the MME.

According to the fifth or the sixth possible implementation manner of the fourth aspect, in a seventh possible implementation manner, the second experience quality information includes any one of the following:

an experience level of the second bearer; or an experience level required for transmitting the service by using the second bearer.

According to a fifth aspect, an embodiment of the present invention further provides a bearer setup method, including:

receiving, by an MME, a bearer setup request message sent by a PGW, where the bearer setup request message is used to request to set up a bearer of a service, the bearer setup request message includes first experience quality information, the first experience quality information is an experience level related to the service, and the service is a service initiated by UE or a service initiated by a network-side device;

sending, by the MME, the bearer setup request message to a base station, so that if the base station accepts the bearer setup request message, the base station sets up a first bearer that is used to transmit the service; and receiving, by the MME, a bearer setup complete response message sent by the base station.

According to the fifth aspect, in a first possible implementation manner, the first experience quality information includes any one of the following:

an experience level of the first bearer; or an experience level required for transmitting the service by using the first bearer.

According to the fifth aspect or the first possible implementation manner of the fifth aspect, in a second possible implementation manner, the first experience quality information is an experience level determined by the network-side device according to a subscribed experience level of the UE and an experience level required for transmitting the service.

According to any one of the fifth aspect to the second possible implementation manner of the fifth aspect, in a third possible implementation manner, the method further includes:

if the base station does not accept the bearer setup request message, receiving, by the MME, an experience assurance negotiation request message sent by the base station, where the experience assurance negotiation request message includes second experience quality information currently supported by the base station, and the second experience quality information is an experience level determined by the base station according to a quality of service range supported by the base station;

if the second experience quality information meets the first experience quality information, determining, by the MME, that a second bearer that the base station requests to set up may be set up; and sending, by the MME, an experience assurance negotiation response message to the base station, to instruct the base station to set up the second bearer for transmitting the service.

According to the third possible implementation manner of the fifth aspect, in a fourth possible implementation manner, the second experience quality information includes any one of the following:

an experience level of the second bearer; or an experience level required for transmitting the service by using the second bearer.

According to the fourth possible implementation manner of the fifth aspect, in a fifth possible implementation manner, if the second experience quality information meets the first experience quality information, the determining, by the MME, that a second bearer that the base station requests to set up may be set up includes:

if the experience level included in the second experience quality information falls within a range of the experience level included in the first experience quality information, determining, by the MME, that the second bearer that the base station requests to set up may be set up.

According to a sixth aspect, an embodiment of the present invention further provides a bearer setup method, including:

receiving, by UE, an RRC connection configuration message sent by a base station, where the RRC connection configuration message is a message sent by the base station when the base station sets up a bearer, the RRC connection configuration message includes experience quality information, the experience quality information is an experience level related to a service that the UE needs to transmit, and the service is a service initiated by the UE, or a service initiated by a network-side device;

configuring, by the UE, a transmission channel according to the RRC connection configuration message; and sending, by the UE, an RRC connection configuration complete message to the base station, to indicate that a bearer between the base station and the UE has been set up.

According to the sixth aspect, in a first possible implementation manner of the sixth aspect, the RRC connection configuration message is a first RRC connection configuration message that is sent to the UE by the base station when the base station accepts a bearer setup request message sent by an MME, the first RRC connection configuration message includes first experience quality information, and the established bearer is a first bearer.

According to the sixth aspect or the first possible implementation manner of the sixth aspect, in a second possible implementation manner, the first experience quality information includes any one of the following:

an experience level of the first bearer; or an experience level required for transmitting the service by using the first bearer.

According to any one of the sixth aspect to the second possible implementation manner of the sixth aspect, in a third possible implementation manner, the first experience quality information is an experience level determined by the network-side device according to a subscribed experience level of the UE and an experience level required for transmitting the service.

According to the sixth aspect, in a fourth possible implementation manner of the sixth aspect, the RRC connection configuration message is a second RRC connection configuration message that is sent to the UE by the base station when the base station does not accept a bearer setup request message sent by an MME, the second RRC connection configuration message includes second experience quality information, and the established bearer is a second bearer; and the second experience quality information is experience quality information determined by the base station according to a quality of service range supported by the base station.

According to the fourth possible implementation manner of the sixth aspect, in a fifth possible implementation manner, the second experience quality information includes any one of the following:

an experience level of the second bearer; or an experience level required for transmitting the service by using the second bearer.

Based on the bearer setup apparatus and method provided in the embodiments of the present invention, a base station determines, according to a current load status and bearer setup request information that includes experience quality information indicating an experience level related to a service, whether to accept the bearer setup request message; and sets up a bearer according to a result of the determining. Therefore, the bearer set up by the base station can ensure an experience level of the service, so as to improve user experience for the service transmitted based on the established bearer.

BRIEF DESCRIPTION OF DRAWINGS

To describe the technical solutions in the embodiments of the present invention art more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied in a Long Term Evolution (LTE for short) system, an LTE frequency division duplex (FDD for short) system, an LTE time division duplex (TDD for short) system, and the like.

Figure 1:
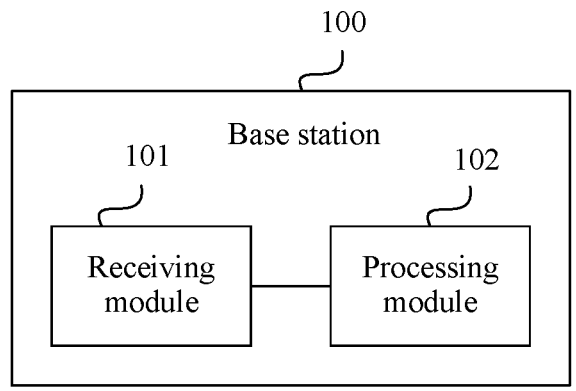
FIG. 1 is a schematic structural diagram of a base station according to an embodiment of the present invention.

FIG. 1 is a schematic structural diagram of a base station according to an embodiment of the present invention. The base station may be an evolved NodeB (eNodeB), a pico base station (Pico), or the like.

As shown in FIG. 1, the base station 100 includes: a receiving module 101 and a processing module 102.

The receiving module 101 is configured to receive a bearer setup request message sent by a mobility management entity (Mobility Management Entity, MME for short). The bearer setup request message is used to request to set up a bearer of a service, and the bearer setup request message includes first experience quality information. The first experience quality information is an experience level related to the service. The service is a service initiated by UE or a service initiated by a network-side device.

Specifically, the bearer setup request message may be, for example, a message sent by using an S1 air interface. The first experience quality information is corresponding to a corresponding experience level. Classification of experience levels may include multiple cases. For example, the experience levels may be user satisfaction degrees that may include unsatisfied, satisfied, very satisfied, and the like; or may be experience levels that may include levels 1, 2, 3, 4, and 5. A lower experience level indicates a lower quality of experience requirement, and correspondingly, a higher level indicates a higher quality of experience requirement. Further, packet loss rates, delays, or data transmission jitters may be classified into different ranges, and the different ranges of the packet loss rates, the delays, or the data transmission jitters are corresponding to different experience levels. User satisfaction degrees for the different ranges of the packet loss rates, the delays, or the data transmission jitters may include: unsatisfied, satisfied, and very satisfied; levels 1, 2, and 3; or the like. Alternatively, an experience level corresponding to experience quality information may be, for example, indicated by using a mean opinion score (MOS for short) level, and the mean opinion score level may include levels 1, 2, 3, 4, and 5. A higher level indicates a higher MOS level, that is, a higher experience level.

The experience quality information included in the bearer setup request message indicates the experience level related to the service. Therefore, when a bearer is set up based on the experience level related to the service, the bearer can ensure an experience level of the service, so as to improve experience for the service transmitted on the established bearer.

The processing module 102 is configured to: determine, according to a current load status and the first experience quality information, whether the base station accepts the bearer setup request message; and if the base station accepts the bearer setup request message, set up a first bearer that is used to transmit the service.

For example, the current load status may be a load status, such as a bandwidth status, that is of a current network and determined by the base station. Determining according to the current load status and the first experience quality information may be, for example, determining whether a network resource required by a bearer corresponding to the first experience quality information matches the current load status. If the network resource required by the bearer corresponding to the first experience quality information matches the current load status, the base station accepts the bearer setup request message. Correspondingly, if the network resource required by the bearer corresponding to the first experience quality information does not match the current load status, the base station does not accept the bearer setup request message.

The base station provided in the solution of this embodiment can determine, according to a current load status and bearer setup request information that includes experience quality information indicating an experience level related to a service, whether to accept the bearer setup request message; and set up a bearer according to a result of the determining. Therefore, the bearer set up by the base station can ensure an experience level of the service, so as to improve user experience for the service transmitted based on the established bearer.

In this embodiment, a basic granularity of quality of experience control is per bearer, that is, all service data flows on a same bearer provide same experience. Different types of bearers provide different experience assurance. Different bearers are needed to control different experience requirements, that is, different bearers need to be set up according to the different quality of experience.

Even further, the processing module 102 described in the foregoing solution of this embodiment is further configured to: determine, according to the first experience quality information, the network resource required by the bearer corresponding to the first experience quality information, and determine, according to the current load status, a network resource that can be currently provided; and if the network resource that can be currently provided is greater than or equal to the network resource required by the bearer corresponding to the first experience quality information, determine that the base station accepts the bearer setup request message; or if the network resource that can be currently provided is less than the network resource required by the bearer corresponding to the first experience quality information, determine that the base station does not accept the bearer setup request message.

The network resource that can be currently provided may be, for example, a resource obtained by the processing module 102 by subtracting a network resource occupied by an existing load from total network resources. The network resource required by the bearer corresponding to the first experience quality information may be a network resource required for setting up a bearer that meets the first experience quality information.

Specifically, the base station may determine whether the base station has sufficient spectrum resources to provide a qualified channel status for the UE, for example, a signal to interference plus noise ratio (SINR for short); determine whether the base station has sufficient network resources to send data from the beginning, to reduce an initial waiting time of the service; determine whether the base station has sufficient bandwidth resources to ensure that the service is smooth without being stalled; or the like, thereby determining whether the base station has sufficient resources to ensure that a to-be-established bearer meets the experience level corresponding to the first experience quality information.

For example, assuming that the network resource required by the bearer corresponding to the first experience quality information is 50 M, and the network resource that can be currently provided is 60 M, it indicates that the current network has sufficient network resources to reach the experience level indicated by the first experience quality information. In this case, the processing module 102 accepts the bearer setup request message. If the network resource required by the bearer corresponding to the first experience quality information is 50 M, but the network resource that can be currently provided is 40 M, it indicates that the current network has a relatively small quantity of available resources, and it is difficult to reach the experience level indicated by the first experience quality information. In this case, the processing module 102 may determine not to accept the bearer setup request message, that is, refuse to accept bearer setup corresponding to the bearer setup request message.

Figure 2:
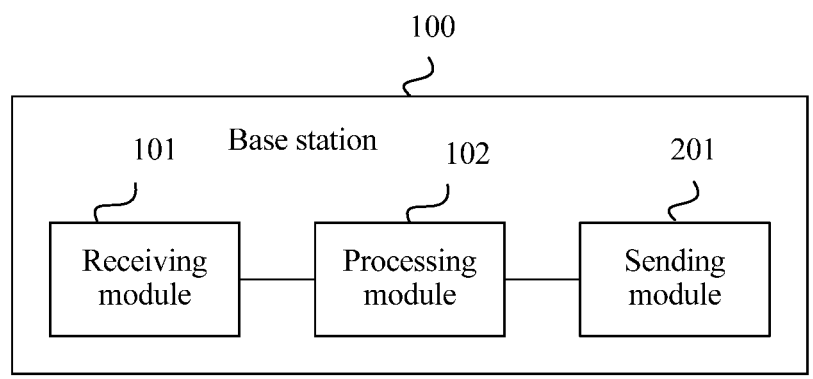
FIG. 2 is a schematic structural diagram of another base station according to an embodiment of the present invention.

On a basis of the foregoing solution, the embodiments of the present invention further provide a base station. FIG. 2 is a schematic structural diagram of another base station according to an embodiment of the present invention.

As shown in FIG. 2, on a basis of the foregoing described base station, the base station 100 further includes a sending module 201.

The sending module 201 is configured to send a first radio resource control (Radio Resource Control, RRC for short) connection configuration message to the UE, to instruct the UE to configure a transmission channel according to the first RRC connection configuration message. The first RRC connection configuration message includes the first experience quality information.

The receiving module 101 is further configured to receive a first RRC connection configuration complete message sent by the UE after the UE completes configuration of the transmission channel.

The sending module 201 is further configured to send a first bearer setup complete response message to the MME.

Specifically, the bearer setup request message that is sent by the MME and received by the base station 100 further includes a non-access stratum (NAS for short) protocol data unit (PDU for short), NAS-PDU for short, that is used to bear context receiving. The NAS-PDU includes the first experience quality information. The sending module 201 may carry the first experience quality information in the first RRC connection configuration message by using the NAS-PDU, and send the first RRC connection configuration message to the UE.

After receiving the first RRC connection configuration message, the UE sets up a dedicated transmission channel (DTCH for short), a Radio Link Control (RLC for short) entity, and a Packet Data Convergence Protocol (PDCP for short) entity, and configures the established transmission channel according to the first RRC connection configuration message. After the UE completes configuration, the first bearer between the UE and the base station 100 is set up. Therefore, the UE further sends the first RRC connection configuration complete message to the base station 100. After receiving the first RRC connection configuration complete message sent by the UE, the base station 100 further needs to feed back a setup status of the first bearer to the MME, that is, send the first bearer setup complete response message to the MME.

In the solution of this embodiment, UE can configure a transmission channel between a base station and the UE according to RRC connection configuration information that includes first experience quality information. Therefore, it can be ensured that all transmission channels from a network-side device to the UE can ensure an experience requirement of a service, so as to improve user experience.

Preferably, the foregoing described first experience quality information includes any one of the following:

an experience level of the first bearer; or an experience level required for transmitting the service by using the first bearer.

Further, the first experience quality information is an experience level determined by the network-side device according to a subscribed experience level of the UE and an experience level required for transmitting the service.

It should be noted that the foregoing bearer setup request message may be a request message that is sent by a packet data network gateway (PGW for short) by using a serving gateway (S-GW for short) and that is received by the MME. The first experience quality information may include the experience level of the first bearer and the experience level required for transmitting the service by using the first bearer that are determined by the PGW according to a service experience level included in a Policy and Charging Control (PCC for short) rule that is determined and sent by a policy and charging rules function (PCRF for short) unit.

The service experience level included in the PCC rule may be specifically an experience level that is determined by the PCRF according to the subscribed experience level of the UE and the experience level required for transmitting the service. The subscribed experience level of the UE may be service subscription information that is corresponding to the UE and obtained by the PCRF by using a subscription profile repository (SPR for short), for example, the subscribed experience level of the UE. The experience level required for transmitting the service may be an experience level that is required for transmitting the service and obtained by the PCRF by using an application function (AF for short) device.

For example, assuming that the PCRF obtains the subscribed experience level of the UE, specific content of the experience level may be, for example, that subscribed network traffic of the UE is 100 M for a current month. An experience level that is of the service itself and obtained by the PCRF may be an experience level that is required for transmitting the service and determined according to performance of the service. Specifically, for example, it may be determined based on the service, for example, a video service that at least 50 M traffic is required for transmitting the service. In this case, the PCRF compares the subscribed experience level of the UE with the experience level required for transmitting the service; and if the subscribed experience level of the UE is higher than the experience level required for transmitting the UE, may determine that the experience level of the service is the experience level required for transmitting the service, that is, the UE has a resource for transmitting the service. After determining that the UE has the resource for transmitting the service, the PCRF further needs to determine whether there are sufficient network resources for transmitting the service. Further, the PGW determines, according to the PCC rule, that the service experience level determined by the PCRF is an experience level corresponding to a bearer, that is, the experience level of the first bearer and/or the experience level required for transmitting the service by using the first bearer.

Optionally, the sending module 201 is further configured to: if the base station does not accept the bearer setup request message, send an experience assurance negotiation request message to the MME. The experience assurance negotiation request message includes second experience quality information currently supported by the base station, and the second experience quality information is an experience level determined by the base station according to a quality of service range supported by the base station.

The receiving module 101 is further configured to: if the MME confirms that the second experience quality information meets the first experience quality information, receive an experience assurance negotiation response message sent by the MME.

Specifically, the experience level included in the first experience quality information may be a level interval. If the experience level included in the second experience quality information falls within an interval range of the experience level included in the first experience quality information, it may be considered that the second experience quality information meets the first experience quality information.

The processing module 102 is further configured to set up a second bearer that is used to transmit the service.

Specifically, the experience assurance negotiation request message may be, for example, a quality of experience negotiation request message. The experience assurance negotiation response message may be, for example, a quality of experience negotiation response message.

Further, the sending module 201 is further configured to send a second RRC connection configuration message to the UE, to instruct the UE to configure the transmission channel according to the second RRC connection configuration message, where the second RRC connection configuration message includes the second experience quality information.

The receiving module 101 is further configured to receive a second RRC connection configuration complete message sent by the UE after the UE completes configuration of the transmission channel.

The sending module 201 is further configured to send a second bearer setup complete response message to the MME.

It should be noted that a process in which the base station sets up the second bearer for transmitting the service is similar to a process in which the base station sets up the first bearer for transmitting the service, and an only difference between the processes is that setting up is performed according to different experience levels. Specific explanations and descriptions are similar to those in the foregoing embodiment, and details are not described herein again.

Preferably, the second experience quality information includes any one of the following:
an experience level of the second bearer; or
an experience level required for transmitting the service by using the second bearer.

The base station provided based on the solution of this embodiment determines, according to a load status of the base station and first experience quality information, whether to accept a bearer setup request message, and may set up, according to a result of the determining and according to a corresponding experience level, a bearer for transmitting a service. The bearer set up in this way ensures an experience level for transmitting the service and further conforms to a current network status, so as to better ensure user experience.

Figure 3:
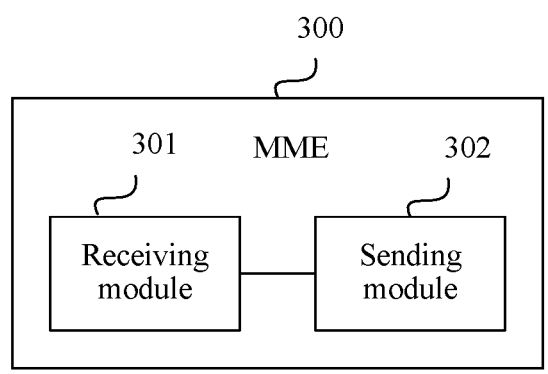
FIG. 3 is a schematic structural diagram of an MME according to an embodiment of the present invention.

The embodiments of the present invention further provide an MME. FIG. 3 is a schematic structural diagram of an MME according to an embodiment of the present invention. As shown in FIG. 3, an MME 300 includes a receiving module 301 and a sending module 302.

The receiving module 301 is configured to receive a bearer setup request message sent by a PGW. The bearer setup request message is used to request to set up a bearer of a service, and the bearer setup request message includes first experience quality information. The first experience quality information is an experience level related to the service. The service is a service initiated by UE or a service initiated by a network-side device.

The sending module 302 is configured to send the bearer setup request message to a base station, so that if the base station accepts the bearer setup request message, the base station sets up a first bearer that is used to transmit the service.

The receiving module 301 is further configured to receive a bearer setup complete response message sent by the base station.

The MME provided in the solution of this embodiment may be implemented in cooperation with the base station described in the solution of the foregoing embodiments, to set up a bearer for transmitting the service. A specific implementation process and beneficial effects of setting up the bearer for transmitting the service are similar to those in the foregoing embodiments, and details are not described herein again.

Preferably, the first experience quality information includes any one of the following:
an experience level of the first bearer; or
an experience level required for transmitting the service by using the first bearer.

Further, the first experience quality information is an experience level determined by the network-side device according to a subscribed experience level of the UE and an experience level required for transmitting the service.

Optionally, the receiving module 301 is further configured to: if the base station does not accept the bearer setup request message, receive an experience assurance negotiation request message sent by the base station. The experience assurance negotiation request message includes second experience quality information currently supported by the base station, and the second experience quality information is an experience level determined by the base station according to a quality of service range supported by the base station.

Correspondingly, the MME 300 further includes:

a processing module, configured to: if the second experience quality information meets the first experience quality information, determine that a second bearer that the base station requests to set up may be set up.

The sending module 302 is further configured to send an experience assurance negotiation response message to the base station, to instruct the base station to set up the second bearer for transmitting the service.

Preferably, the second experience quality information includes any one of the following:

an experience level of the second bearer; or an experience level required for transmitting the service by using the second bearer.

Further, the processing module is further configured to: if the experience level included in the second experience quality information falls within a range of the experience level included in the first experience quality information, determine that the MME may set up the second bearer that the base station requests to set up.

If the experience level included in the second experience quality information is lower than the experience level included in the first experience quality information, it may be considered that the experience level included in the second experience quality information falls within the range of the experience level included in the first experience quality information.

The MME provided in this embodiment may cooperate with the base station provided in the foregoing embodiment, to set up a bearer for transmitting the service. Beneficial effects of setting up the bearer for transmitting the service are similar to those in the foregoing embodiments, and details are not described herein again.

Figure 4:
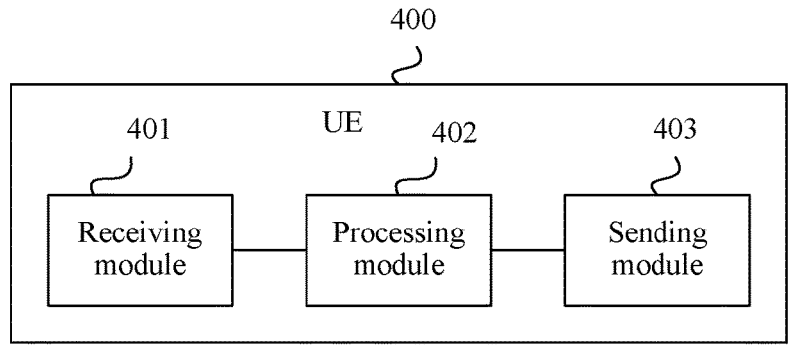
FIG. 4 is a schematic structural diagram of UE according to an embodiment of the present invention.

The embodiments of the present invention further provide UE. FIG. 4 is a schematic structural diagram of UE according to an embodiment of the present invention. As shown in FIG. 4, the UE 400 includes: a receiving module 401, a processing module 402, and a sending module 403.

The receiving module 401 is configured to receive an RRC connection configuration message sent by a base station. The RRC connection configuration message is a message sent by the base station when the base station sets up a bearer, and the RRC connection configuration message includes experience quality information. The experience quality information is an experience level related to a service that the UE needs to transmit. The service is a service initiated by the UE, or a service initiated by a network-side device.

The processing module 402 is configured to configure a transmission channel according to the RRC connection configuration message.

The sending module 403 is configured to send an RRC connection configuration complete message to the base station, to indicate that a bearer between the base station and the UE has been set up.

Further, the RRC connection configuration message is a first RRC connection configuration message that is sent to the UE by the base station when the base station accepts a bearer setup request message sent by an MME. The first RRC connection configuration message includes first experience quality information. The established bearer is a first bearer.

Preferably, the first experience quality information includes any one of the following:

an experience level of the first bearer; or an experience level required for transmitting the service by using the first bearer.

In the foregoing solution, the first experience quality information is an experience level determined by the network-side device according to a subscribed experience level of the UE and an experience level required for transmitting the service.

Optionally, the RRC connection configuration message is a second RRC connection configuration message that is sent to the UE by the base station when the base station does not accept a bearer setup request message sent by an MME. The second RRC connection configuration message includes second experience quality information. The established bearer is a second bearer.

The second experience quality information is experience quality information determined by the base station according to a quality of service range supported by the base station.

Further, the second experience quality information includes any one of the following:

an experience level of the second bearer; or an experience level required for transmitting the service by using the second bearer.

The UE provided in this embodiment may cooperate with the base station and the MME provided in the foregoing embodiments, to set up a bearer for transmitting a service. Beneficial effects of setting up the bearer for transmitting the service are similar to those in the foregoing embodiments, and details are not described herein again.

Figure 5:
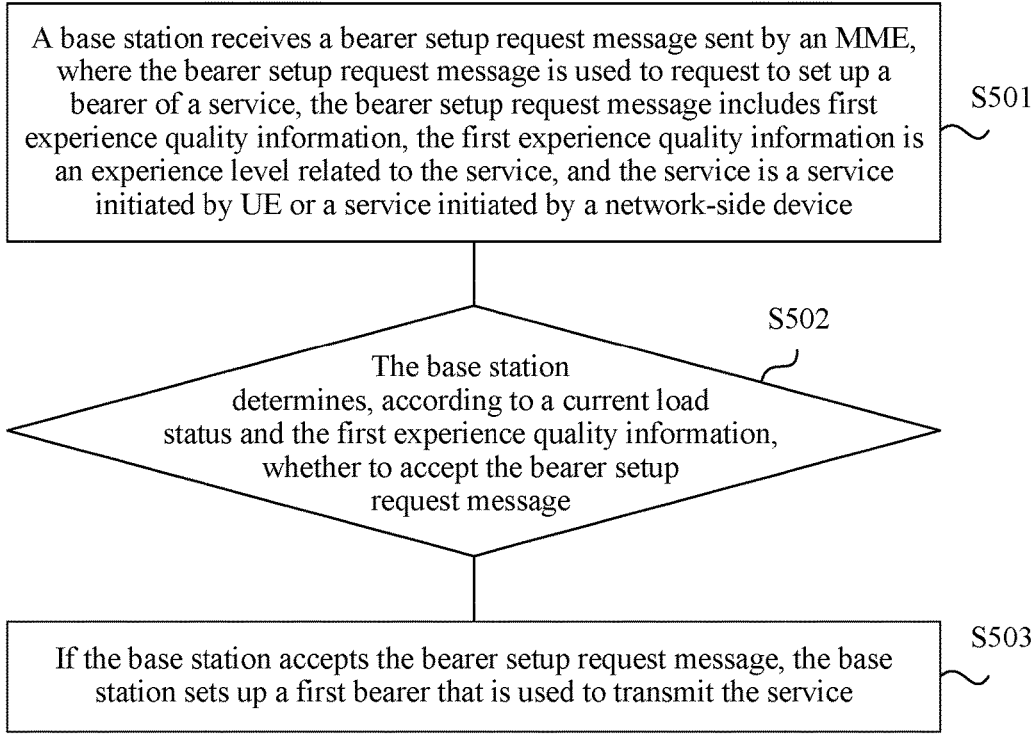
FIG. 5 is a flowchart of a bearer setup method according to an embodiment of the present invention.

The embodiments further provide a bearer setup method. FIG. 5 is a flowchart of a bearer setup method according to an embodiment of the present invention. As shown in FIG. 5, the method in this embodiment includes the following steps:

Step 501: A base station receives a bearer setup request message sent by an MME, where the bearer setup request message is used to request to set up a bearer of a service, the bearer setup request message includes first experience quality information, the first experience quality information is an experience level related to the service, and the service is a service initiated by UE or a service initiated by a network-side device.

Step 502: The base station determines, according to a current load status and the first experience quality information, whether to accept the bearer setup request message.

Step 503: If the base station accepts the bearer setup request message, the base station sets up a first bearer that is used to transmit the service.

The bearer setup method provided in the solution of this embodiment may be performed by the base station provided in the foregoing embodiment. A specific implementation process and beneficial effects of the bearer setup method are similar to those in the foregoing embodiments, and details are not described herein again.

Further, in the solution of the foregoing embodiment, that the base station determines, according to the current load status and the first experience quality information, whether to accept the bearer setup request message in step 502 specifically includes:

determining, by the base station according to the first experience quality information, a network resource required by a bearer corresponding to the first experience quality information, and determining, according to the current load status, a network resource that can be currently provided; and if the network resource that can be currently provided is greater than or equal to the network resource required by the bearer corresponding to the first experience quality information, determining, by the base station, to accept the bearer setup request message; or if the network resource that can be currently provided is less than the network resource required by the bearer corresponding to the first experience quality information, determining, by the base station, not to accept the bearer setup request message.

On a basis of the foregoing method, that the base station sets up the first bearer that is used to transmit the service in step 503 specifically includes:

sending, by the base station, a first RRC connection configuration message to the UE, to instruct the UE to configure a transmission channel according to the first RRC connection configuration message, where the first RRC connection configuration message includes the first experience quality information;

receiving, by the base station, a first RRC connection configuration complete message sent by the UE after the UE completes configuration of the transmission channel; and sending, by the base station, a first bearer setup complete response message to the MME.

Preferably, the first experience quality information includes any one of the following:

an experience level of the first bearer; or an experience level required for transmitting the service by using the first bearer.

The first experience quality information is an experience level determined by the network-side device according to a subscribed experience level of the UE and an experience level required for transmitting the service.

On a basis of the foregoing described solution in this embodiment, further, the method further includes:

if the base station does not accept the bearer setup request message, sending, by the base station, an experience assurance negotiation request message to the MME, where the experience assurance negotiation request message includes second experience quality information currently supported by the base station, and the second experience quality information is an experience level determined by the base station according to a quality of service range supported by the base station;

if the MME confirms that the second experience quality information meets the first experience quality information, receiving, by the base station, an experience assurance negotiation response message sent by the MME; and setting up, by the base station, a second bearer that is used to transmit the service.

Further, as described above, the setting up, by the base station, a second bearer that is used to transmit the service includes:

sending, by the base station, a second RRC connection configuration message to the UE, to instruct the UE to configure the transmission channel according to the second RRC connection configuration message, where the second RRC connection configuration message includes the second experience quality information;

receiving, by the base station, a second RRC connection configuration complete message sent by the UE after the UE completes configuration of the transmission channel; and sending, by the base station, a second bearer setup complete response message to the MME.

Preferably, the second experience quality information includes any one of the following:

an experience level of the second bearer; or an experience level required for transmitting the service by using the second bearer.

The bearer setup method provided in the solution of this embodiment may be performed by the base station provided in the foregoing embodiment. A specific implementation process and beneficial effects of the bearer setup method are similar to those in the foregoing embodiments, and details are not described herein again.

Figure 6:
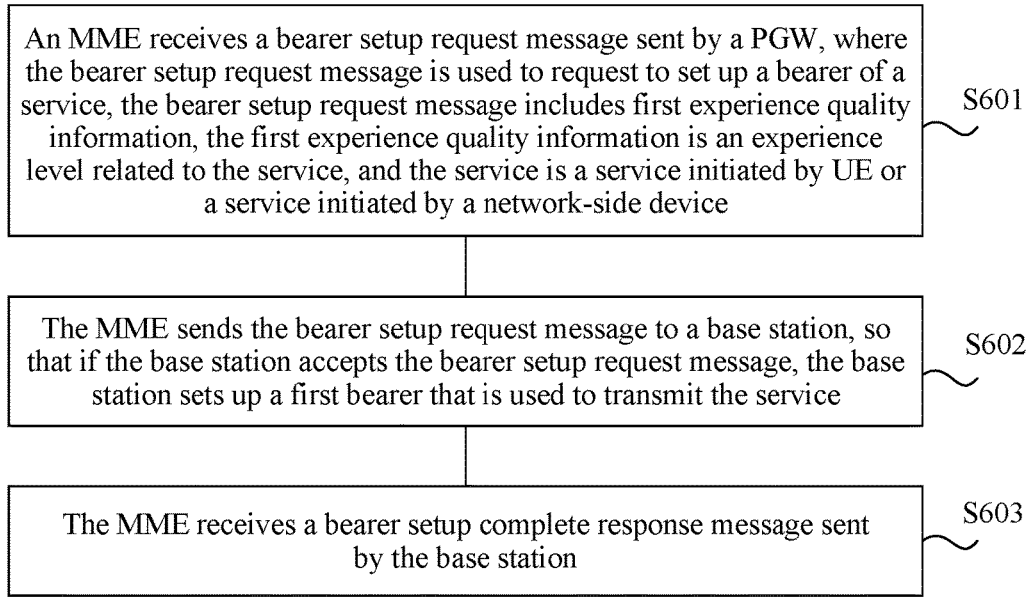
FIG. 6 is a flowchart of another bearer setup method according to an embodiment of the present invention.

The embodiments of the present invention further provide a bearer setup method. FIG. 6 is a flowchart of another bearer setup method according to an embodiment of the present invention. As shown in FIG. 6, the method specifically includes the following steps:

Step 601: An MME receives a bearer setup request message sent by a PGW, where the bearer setup request message is used to request to set up a bearer of a service, the bearer setup request message includes first experience quality information, the first experience quality information is an experience level related to the service, and the service is a service initiated by UE or a service initiated by a network-side device.

Step 602: The MME sends the bearer setup request message to a base station, so that if the base station accepts the bearer setup request message, the base station sets up a first bearer that is used to transmit the service.

Step 603: The MME receives a bearer setup complete response message sent by the base station.

The bearer setup method provided in the solution of this embodiment may be performed by the MME provided in the foregoing embodiment. A specific implementation process and beneficial effects of the bearer setup method are similar to those in the foregoing embodiments, and details are not described herein again.

Preferably, the first experience quality information includes any one of the following:

an experience level of the first bearer; or an experience level required for transmitting the service by using the first bearer.

Specifically, the first experience quality information is an experience level determined by the network-side device according to a subscribed experience level of the UE and an experience level required for transmitting the service.

Further, the method further includes:

if the base station does not accept the bearer setup request message, receiving, by the MME, an experience assurance negotiation request message sent by the base station, where the experience assurance negotiation request message includes second experience quality information currently supported by the base station, and the second experience quality information is an experience level determined by the base station according to a quality of service range supported by the base station;

if the second experience quality information meets the first experience quality information, determining, by the MME, that a second bearer that the base station requests to set up may be set up; and sending, by the MME, an experience assurance negotiation response message to the base station, to instruct the base station to set up the second bearer for transmitting the service.

Preferably, the second experience quality information includes any one of the following:

an experience level of the second bearer; or an experience level required for transmitting the service by using the second bearer.

Further, in the foregoing solution, if the second experience quality information meets the first experience quality information, the determining, by the MME, that a second bearer that the base station requests to set up may be set up specifically includes:

if the experience level included in the second experience quality information falls within a range of the experience level included in the first experience quality information, determining, by the MME, that the second bearer that the base station requests to set up may be set up.

The bearer setup method provided in the solution of this embodiment may be performed by the MME provided in the foregoing embodiment. A specific implementation process and beneficial effects of the bearer setup method are similar to those in the foregoing embodiments, and details are not described herein again.

Figure 7:
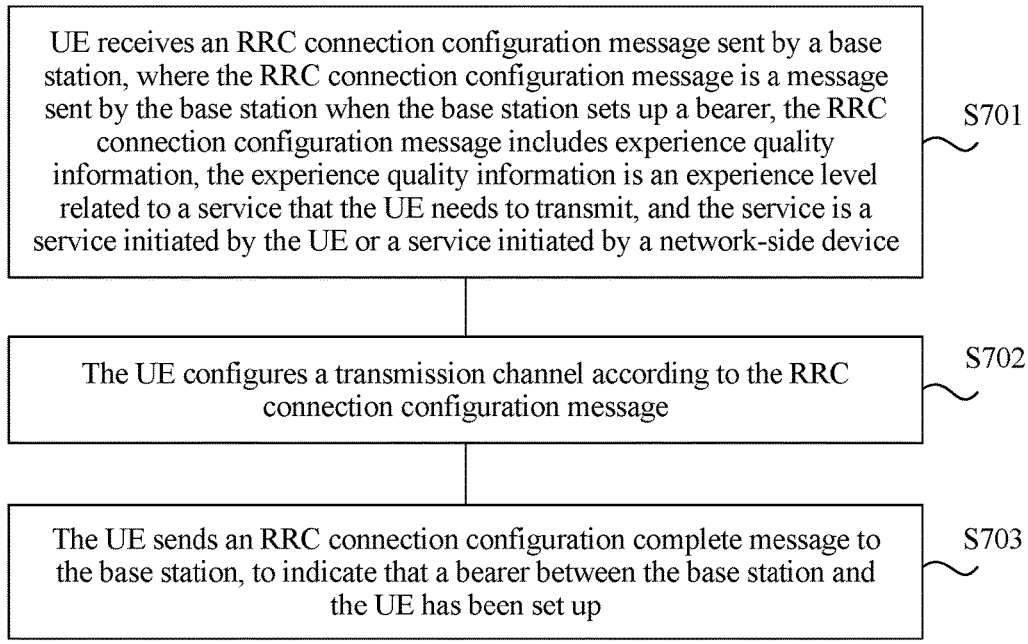
FIG. 7 is a flowchart of still another bearer setup method according to an embodiment of the present invention.

The embodiments of the present invention further provide a bearer setup method. FIG. 7 is a flowchart of still another bearer setup method according to an embodiment of the present invention. As shown in FIG. 7, the method specifically includes the following steps:

Step 701: UE receives an RRC connection configuration message sent by a base station, where the RRC connection configuration message is a message sent by the base station when the base station sets up a bearer, the RRC connection configuration message includes experience quality information, the experience quality information is an experience level related to a service that the UE needs to transmit, and the service is a service initiated by the UE, or a service initiated by a network-side device.

Step 702: The UE configures a transmission channel according to the RRC connection configuration message.

Step 703: The UE sends an RRC connection configuration complete message to the base station, to indicate that a bearer between the base station and the UE has been set up.

The bearer setup method provided in the solution of this embodiment may be performed by the UE provided in the foregoing embodiment. A specific implementation process and beneficial effects of the bearer setup method are similar to those in the foregoing embodiments, and details are not described herein again.

Further, the RRC connection configuration message is a first RRC connection configuration message that is sent to the UE by the base station when the base station accepts a bearer setup request message sent by an MME. The first RRC connection configuration message includes first experience quality information. The established bearer is a first bearer.

Preferably, the first experience quality information includes any one of the following:

an experience level of the first bearer; or an experience level required for transmitting the service by using the first bearer.

In the foregoing solution, the first experience quality information is an experience level determined by the network-side device according to a subscribed experience level of the UE and an experience level required for transmitting the service.

Optionally, the RRC connection configuration message is a second RRC connection configuration message that is sent to the UE by the base station when the base station does not accept a bearer setup request message sent by an MME. The second RRC connection configuration message includes second experience quality information. The established bearer is a second bearer.

The second experience quality information is experience quality information determined by the base station according to a quality of service range supported by the base station.

Preferably, the second experience quality information includes any one of the following:

an experience level of the second bearer; or an experience level required for transmitting the service by using the second bearer.

The bearer setup method provided in the solution of this embodiment may be performed by the UE provided in the foregoing embodiment. A specific implementation process and beneficial effects of the bearer setup method are similar to those in the foregoing embodiments, and details are not described herein again.

Figure 8A:
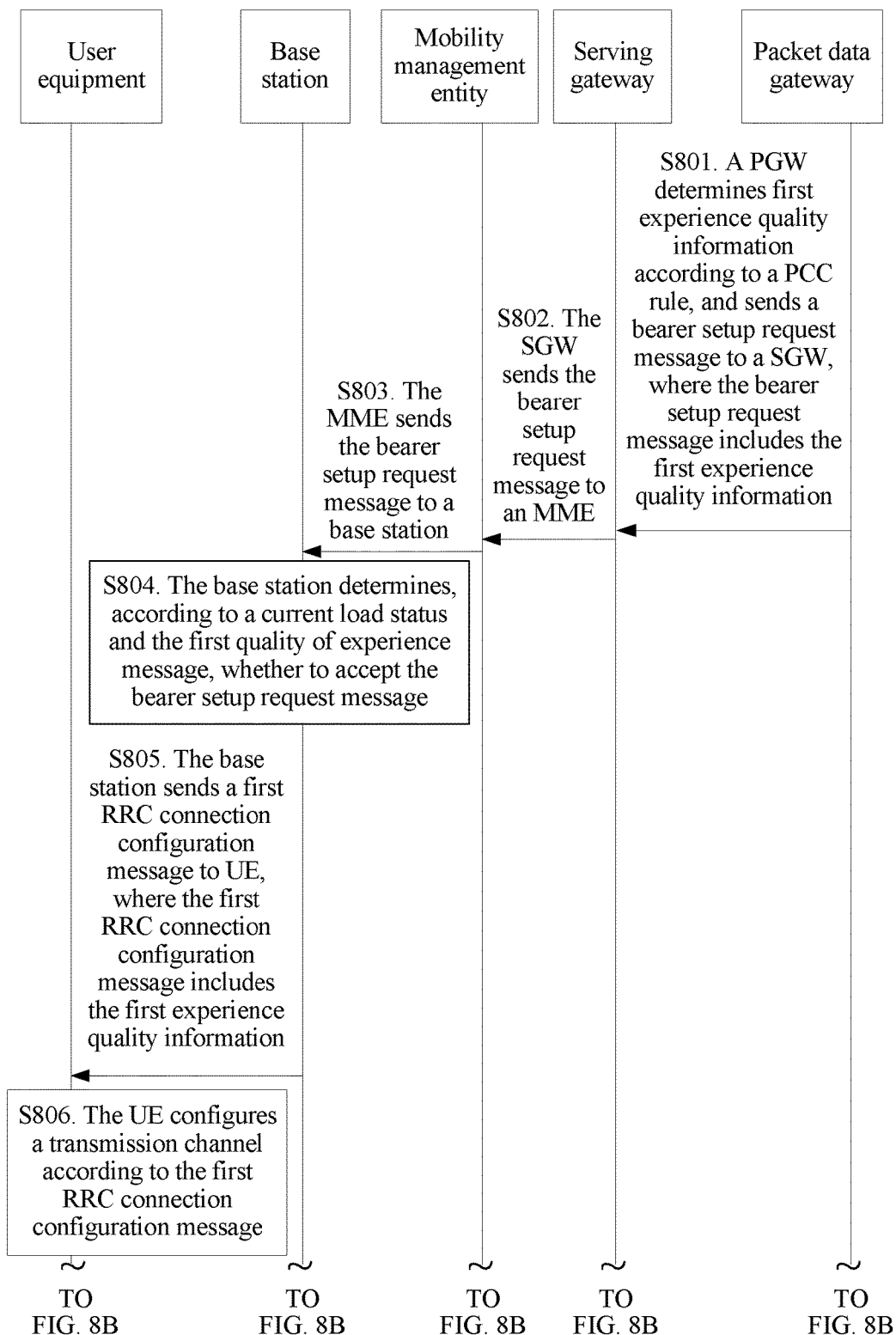
FIG. 8A, FIG. 8B, and FIG. 8C are a flowchart of yet another bearer setup method according to an embodiment of the present invention.
Figure 8B:
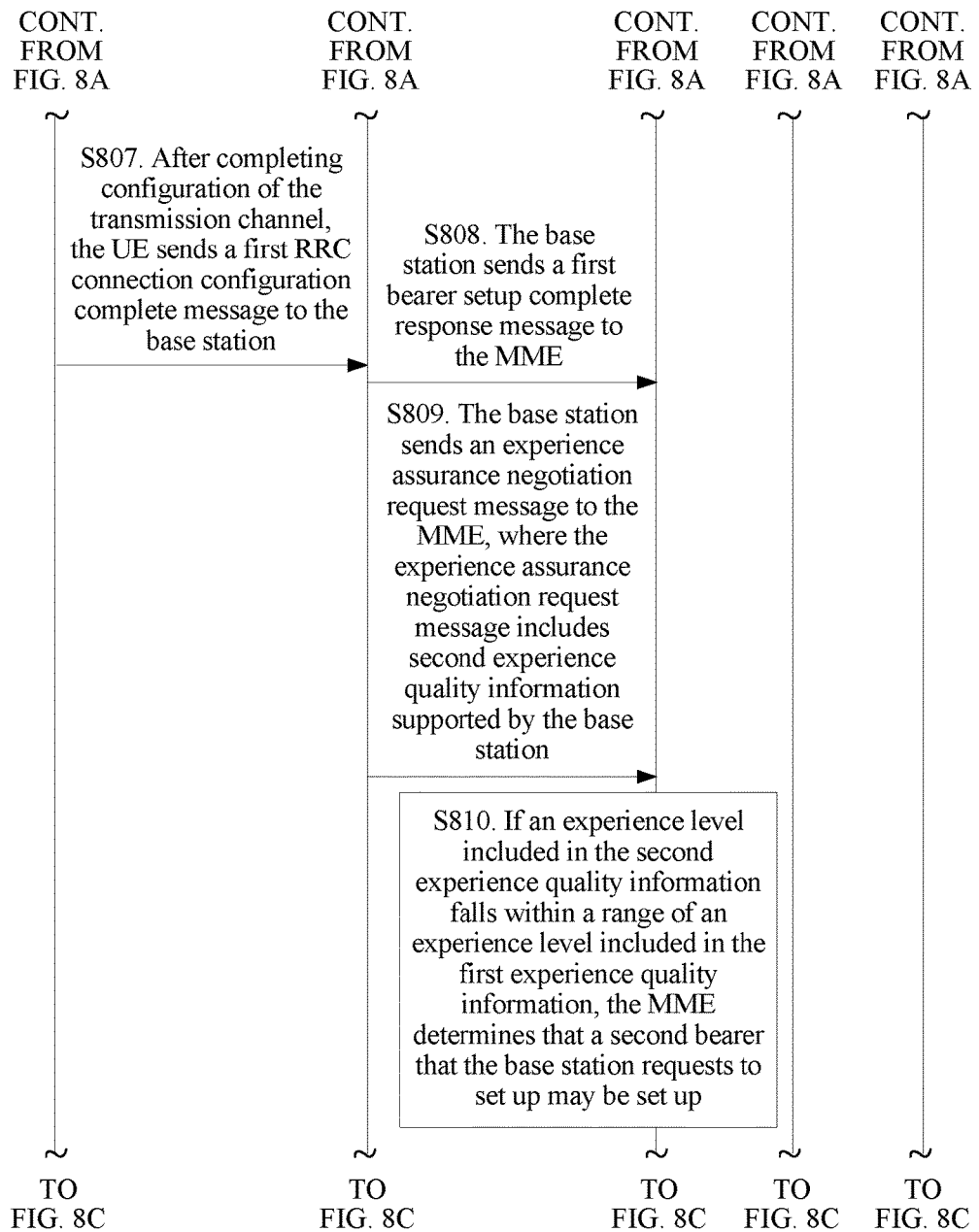
Figure 8C:
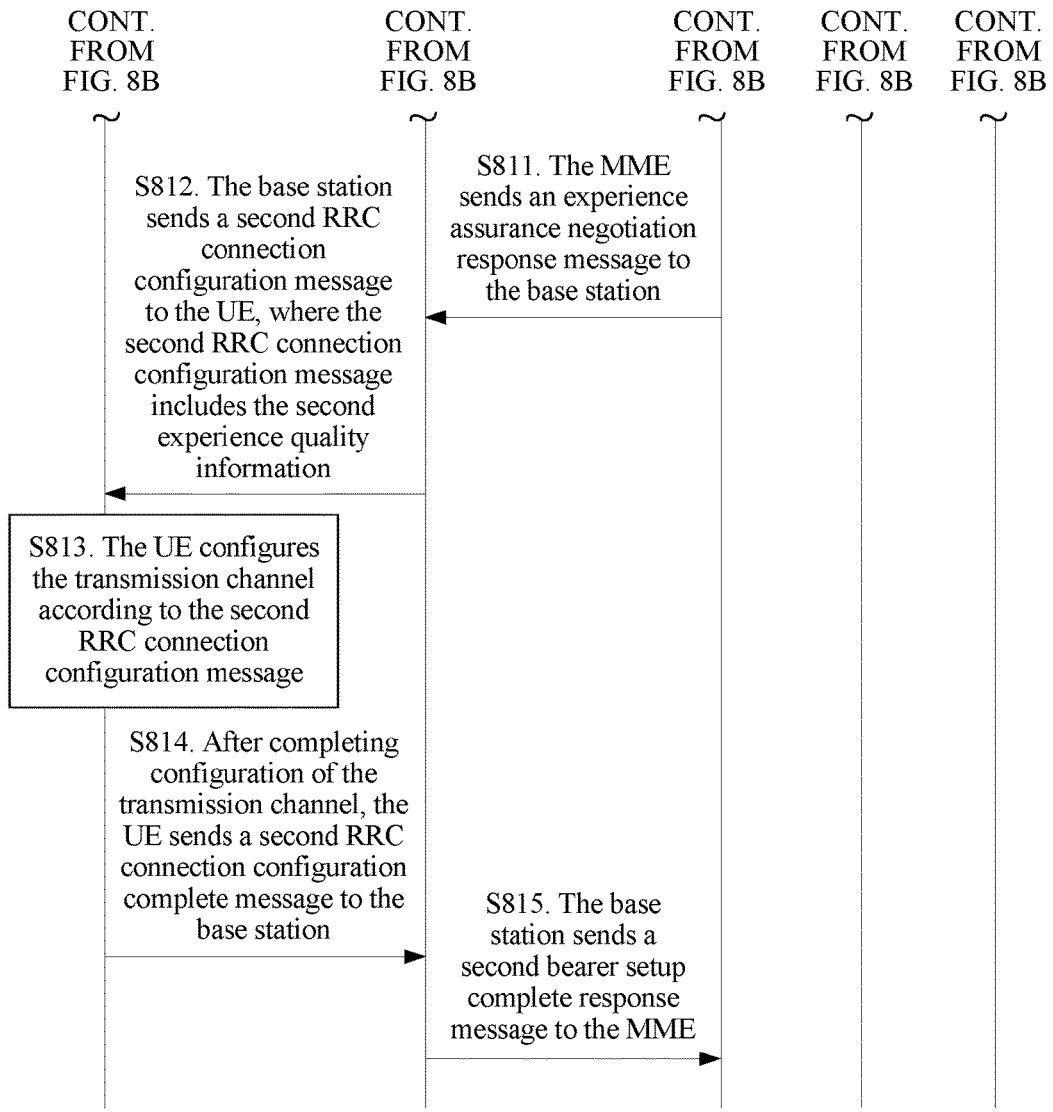

The embodiments further provide a bearer setup method. An embodiment performs explanation and description by using a specific example. FIG. 8A, FIG. 8B, and FIG. 8C are a flowchart of yet another bearer setup method according to the embodiment of the present invention. As shown in FIG. 8A, FIG. 8B, and FIG. 8C, the method specifically includes the following steps.

Step 801: A PGW determines first experience quality information according to a PCC rule, and sends a bearer setup request message to an SGW, where the bearer setup request message includes the first experience quality information.

The PCC rule may be a PCC rule delivered by a PCRF to the PGW. After receiving service request information, the PCRF determines an experience level of a service according to a subscribed experience level of UE and an experience level required for transmitting the service, carries the experience level of the service in the PCC rule, and delivers the PCC rule to the PGW.

The service experience level included in the PCC rule may be specifically an experience level that is determined by the PCRF according to the subscribed experience level of the UE and the experience level required for transmitting the service. The subscribed experience level of the UE may be service subscription information that is corresponding to the UE and obtained by the PCRF by using an SPR, for example, the subscribed experience level of the UE. The experience level required for transmitting the service may be an experience level that is required for transmitting the service and obtained by the PCRF by using an AF device.

For example, assuming that the PCRF obtains the subscribed experience level of the UE, specific content of the experience level may be, for example, that subscribed network traffic of the UE is 100 M for a current month. An experience level that is of the service itself and obtained by the PCRF may be an experience level that is required for transmitting the service and determined according to performance of the service. Specifically, for example, it may be determined based on the service, for example, a video service that at least 50 M traffic is required for transmitting the service. In this case, the PCRF compares the subscribed experience level of the UE with the experience level required for transmitting the service; and if the subscribed experience level of the UE is higher than the experience level required for transmitting the UE, may determine that the experience level of the service is the experience level required for transmitting the service, that is, the UE has a resource for transmitting the service. After determining that the UE has the resource for transmitting the service, the PCRF further needs to determine whether there are sufficient network resources for transmitting the service. Further, the PGW determines, according to the PCC rule, that the service experience level determined by the PCRF is an experience level corresponding to a bearer, that is, an experience level of a first bearer and/or an experience level required for transmitting the service by using a first bearer.

The service may be initiated by the UE, or may be initiated by a network-side device.

If the service is initiated by the UE, before step 801, the method may further include:

sending, by the UE, the service request information to the PCRF by sequentially using network element devices.

The service may be further initiated by the network-side device, and the UE does not need to send the service request information.

It should be noted that the PCC rule may further include a QoS parameter and allocation/retention priority (Allocation and Retention Priority, ARP for short) information. The QoS parameter may be specifically a quality of service class identifier (QoS Class Identifier, QCI for short). The PCC rule further includes the QoS parameter. Therefore, a bearer set up by using the bearer setup method provided in the solution of this embodiment may further ensure quality of service of a service.

After obtaining the PCC rule, the PGW further needs to determine whether it is possible to bind the PCC rule with an existing bearer or a default bearer, that is, determine whether the existing bearer or the default bearer can meet the experience level that is corresponding to the experience quality information determined according to the PCC; and if the existing bearer or the default bearer cannot meet the experience level that is corresponding to the experience quality information determined according to the PCC, sets up a dedicated bearer, and binds the bearer with the first experience quality information in the PCC rule. Preferably, as the PGW determines whether the existing bearer or the default bearer can meet the QoE information determined according to the PPC, the PGW may further determine whether the existing bearer or the default bearer can meet quality of service corresponding to the QoS parameter in the PCC. If the existing bearer or the default bearer can meet the quality of service corresponding to the QoS parameter in the PCC, the PGW binds the bearer with the QoS parameter and the ARP; or if the existing bearer or the default bearer cannot meet the quality of service corresponding to the QoS parameter in the PCC, the PGW triggers setup of a new bearer.

It should be noted that, in the solution of this embodiment, the established bearer, that is, the newly-established bearer, is actually a dedicated bearer.

The dedicated bearer is a bearer that is generated based on the default bearer when a user has another experience requirement besides a basic experience requirement. The dedicated bearer is used to bear a data flow of a specific service and signaling of the specific service while ensuring a specific experience requirement. The default bearer is a bearer that is set up, when the user performs network attachment, for the user to ensure the basic service requirement. The default bearer can bear a basic data flow and signaling while meeting the basic service requirement. An experience level corresponding to the dedicated bearer is higher than an experience level corresponding to the default bearer.

According to the solution of this embodiment, in an LTE or SAE system, the dedicated bearer may be a dedicated SAE bearer. The dedicated bearer further needs to be associated with an uplink traffic flow template (TFT for short) on a UE side, and be associated with a downlink TFT on a network device side such as a PGW side. Therefore, service data flows are grouped by using different TFTs. The different TFTs are separately corresponding to different bearers, and different bearers ensure different experience requirements.

The dedicated SAE bearer may be a guaranteed bit rate (GBR for short) bearer, or may be a non-guaranteed bit rate (Non-GBR for short) bearer. However, a default SAE bearer can only be a non-GBR bearer. In a process of setting up or modifying the GBR bearer and the non-GBR bearer, an admission control function of a base station may be used to allocate a specific network resource permanently to the bearers. The GBR bearer can ensure that a bit rate remains unchanged, but the non-GBT bearer cannot ensure that a bit rate remains unchanged.

The PCC rule further includes TFTs for transmitting uplink and downlink service data. The different TFTs for uplink and downlink service data include filters corresponding to different service data. In the solution of this embodiment, a bearer set up in a network system is set up according to the first experience quality information, and a service requested by the UE may be multiple different services. Although the multiple different services have a same experience requirement, service data of the different services is different. Therefore, the service data of the different services further needs to be grouped. For example, after obtaining the PCC rule, the PGW further needs to save a TFT for downlink data transmission, so that received service data is grouped by using the TFT for downlink data transmission.

The PGW further needs to allocate, to the bearer, a tunnel endpoint identifier (TEID for short) user plane for receiving uplink data. The TEID may be specifically a fully qualified tunnel endpoint identifier (F-TEID for short).

The bearer setup request message further includes an uplink TEID allocated by the PGW. The PGW sends the uplink TEID to the SGW by using the bearer setup request message, so that the SGW saves the uplink TEID allocated by the PGW. The PGW and the SGW both save the uplink TEID allocated by the PGW, thereby completing setup of an uplink transmission tunnel of a user plane between the PGW and the SGW.

Preferably, the bearer setup request message further includes an international mobile subscriber identity (IMSI for short), an uplink TFT, a packet switched network (PDN for short) connection identifier, and a charging identifier corresponding to the bearer. The PGW transmits the uplink TFT to the UE by using the bearer setup request message. Therefore, the UE saves the uplink TFT, and to-be-transmitted uplink service data is grouped by using the uplink TFT.

Step 802: The SGW sends the bearer setup request message to an MME.

As described above, after receiving the bearer setup request message, the SGW further saves the uplink TEID that is in the bearer setup request message and allocated by the PGW. Until now, setup of the uplink transmission tunnel of the user plane between the PGW and the SGW is completed.

It should be noted that, after saving the uplink TEID allocated by the PGW, the SGW further allocates, to the bearer, a TEID for receiving uplink data.

In addition, the SGW further saves the charging identifier corresponding to the bearer. The charging identifier corresponding to the bearer may be an account balance of the UE, consumption information, or the like.

The bearer setup request message further includes: the uplink TEID allocated by the SGW, the IMSI, the uplink TFT, and the charging identifier corresponding to the bearer.

Step 803: The MME sends the bearer setup request message to a base station.

After receiving the bearer setup request message sent by the SGW, the MME allocates a bearer identifier, and sends the bearer setup request message to the base station. Therefore, a bearer of an evolved universal terrestrial radio access network (E-UTRAN for short) part is set up. The bearer setup request message may be sent by the MME by using an SI air interface.

It should be noted that the bearer setup request message sent from the MME to the base station further includes the uplink TEID allocated by the S-GW. Correspondingly, after receiving the bearer setup request message sent by the MME, the base station saves the uplink TEID that is in the bearer setup request message and allocated by the SGW. Until now, setup of an uplink transmission tunnel of a user plane between the base station and the SGW is completed.

Step 804: The base station determines, according to a current load status and the first quality of experience message, whether to accept the bearer setup request message.

If the base station accepts the bearer setup request message, steps 805 to 808 are performed; or if the base station does not accept the bearer setup request message, steps 809 to 815 are performed.

Step 805: The base station sends a first RRC connection configuration message to UE, where the first RRC connection configuration message includes the first experience quality information.

The bearer setup request message received by the base station further includes a non-access stratum (NAS for short) protocol data unit (PDU for short), NAS-PDU for short, that is used to bear context receiving.

It should be noted that, as described above, in the solution of this embodiment, after receiving the bearer setup request message sent by the MME, the base station further needs to save the uplink TEID allocated by the S-GW, thereby completing setup of the uplink tunnel of the user plane between the SGW and the base station.

The first QoE message in the first RRC connection configuration message may be specifically carried in the NAS-PDU to be sent to the UE. It should be noted that the first RRC connection configuration message further includes primary configuration information of a Media Access Control (Media Access Control, MAC for short) layer, an identifier of the first bearer, an identifier of a data radio bearer (DRB for short), an identifier of a logical tunnel, Packet Data Convergence Protocol (PDCP for short) and Radio Link Control (RLC for short), configuration information of a logical channel, and the like.

Step 806: The UE configures a transmission channel according to the first RRC connection configuration message.

After receiving the first RRC connection configuration message, the UE sets up a DTCH, the RLC entity, and the PDCP entity, and configures the established transmission channel according to the first RRC connection configuration message. Therefore, the first bearer between the UE and the base station is set up. In this case, if the UE cannot execute a parameter in the first RRC connection configuration message, and an RRC security function is activated, the UE may perform RRC configuration according to a pre-configured RRC configuration parameter; or if an RRC security function is not activated, the UE enters a radio resource control_IDLE mode (RRC_IDLE for short) mode, and then the UE may perform channel configuration according to the first RRC connection configuration message.

It should be noted that an access stratum (Access Stratum, AS for short) of the UE further transfers the received NAS-PDU to a NAS stratum of the UE. The NAS-PDU includes the identifier of the bearer, the first experience quality information, the PDN connection identifier, and the uplink TFT.

Step 807: After completing configuration of the transmission channel, the UE sends a first RRC connection configuration complete message to the base station.

That the UE completes configuration of the transmission channel means that processing on both the AS stratum and the NAS stratum of the UE is completed. After completing operation on the AS stratum, the UE feeds back the first RRC connection configuration complete message to the base station.

It should be noted that, after completing processing on the NAS stratum, the UE further transports the NAS-PDU to the base station by using an RRC message for uplink information transmission. The NAS-PDU includes the identifier of the bearer. Until now, the first bearer set up by the UE enters an activated state, and may start transmitting uplink data. In addition, the UE further binds the UE with the uplink TFT, so that service data flows on different bearers have a same experience requirement.

Step 808: The base station sends a first bearer setup complete response message to the MME.

After receiving the first RRC connection configuration complete message, the base station feeds back the first bearer setup complete response message to the MME. The first bearer setup complete response message includes the identifier of the bearer and a user-plane address and a downlink TEID that are allocated to downlink data by the base station.

Further, the base station further transmits, to the MME by using an S1 message, the received NAS PDU sent by the NAS stratum of the UE. After receiving both the S1 message and the foregoing first bearer setup complete response message that are sent by the base station, the MME further sends a first bearer setup complete response message to the SGW. The first bearer setup complete response message includes a bearer identifier allocated by the MME and the TEID allocated to the downlink data by the base station.

The SGW saves the downlink TEID allocated by the base station. Until now, setup of both the uplink transmission tunnel and a downlink transmission tunnel of the user plane between the base station and the SGW is completed. The uplink and downlink transmission tunnels of the user plane may be specifically General Packet Radio Service Tunneling Protocol-User Plane (GTP-U for short) tunnels.

The SGW further sends the first bearer setup complete response message to the PGW. The PGW saves a downlink TEID allocated by the SGW. Until now, both the uplink transmission tunnel and a downlink transmission tunnel of the user plane between the SGW and the PGW are successfully set up. Therefore, downlink service data may be sent.

For an EPS system in which PCC is deployed, the PGW further needs to report, to the PCRF, an execution result of the PCC rule.

Step 809: The base station sends an experience assurance negotiation request message to the MME, where the experience assurance negotiation request message includes second experience quality information supported by the base station.

The second experience quality information includes an experience level of a second bearer and/or an experience level required for transmitting the service by using a second bearer.

Step 810: If an experience level included in the second experience quality information falls within a range of an experience level included in the first experience quality information, the MME determines that a second bearer that the base station requests to set up may be set up.

When the experience level included in the second experience quality information is lower than the experience level included in the first experience quality information, it may be considered that the experience level included in the second experience quality information falls within the range of the experience level included in the first experience quality information.

Step 811: The MME sends an experience assurance negotiation response message to the base station.

Step 812: The base station sends a second RRC connection configuration message to the UE, where the second RRC connection configuration message includes the second experience quality information.

Step 813: The UE configures the transmission channel according to the second RRC connection configuration message.

Step 814: After completing configuration of the transmission channel, the UE sends a second RRC connection configuration complete message to the base station.

Step 815: The base station sends a second bearer setup complete response message to the MME.

In this embodiment of the present invention, the solutions of the foregoing embodiments are explained and described by using a specific example. Beneficial effects of the solution are similar to those in the foregoing embodiments, and details are not described herein again.

Figure 9:
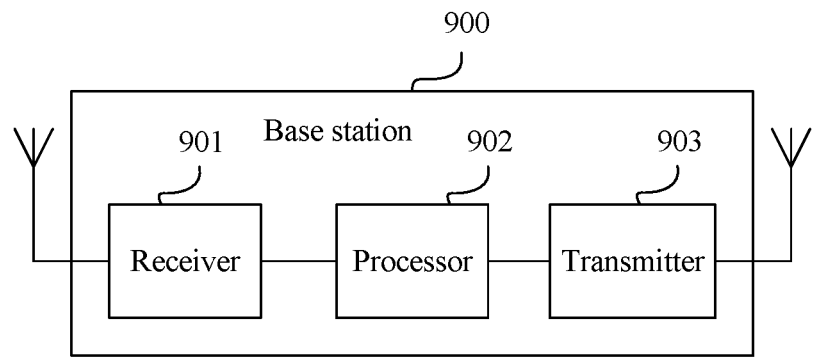
FIG. 9 is a schematic structural diagram of another base station according to an embodiment of the present invention.

The embodiments of the present invention further provide a base station. FIG. 9 is a schematic structural diagram of another base station according to an embodiment of the present invention.

As shown in FIG. 9, the base station 900 includes: a receiver 901, a processor 902, and a transmitter 903.

The receiver 901 is configured to receive a bearer setup request message sent by an MME. The bearer setup request message is used to request to set up a bearer of a service, and the bearer setup request message includes first experience quality information. The first experience quality information is an experience level related to the service. The service is a service initiated by UE or a service initiated by a network-side device.

The processor 902 is configured to: determine, according to a current load status and the first experience quality information, whether the base station accepts the bearer setup request message; and if the base station accepts the bearer setup request message, set up a first bearer that is used to transmit the service.

The base station provided in the solution of this embodiment can determine, according to a current load status and bearer setup request information that includes experience quality information indicating an experience level related to a service, whether to accept the bearer setup request message; and set up a bearer according to a result of the determining. Therefore, the bearer set up by the base station can ensure an experience level of the service, so as to improve user experience for the service transmitted based on the established bearer.

Even further, the processor 902 described in the foregoing solution of this embodiment is further configured to: determine, according to the first experience quality information, a network resource required by a bearer corresponding to the first experience quality information, and determine, according to the current load status, a network resource that can be currently provided; and if the network resource that can be currently provided is greater than or equal to the network resource required by the bearer corresponding to the first experience quality information, determine that the base station accepts the bearer setup request message; or if the network resource that can be currently provided is less than the network resource required by the bearer corresponding to the first experience quality information, determine that the base station does not accept the bearer setup request message.

On a basis of the foregoing solution, the transmitter 903 is configured to send a first RRC connection configuration message to the UE, to instruct the UE to configure a transmission channel according to the first RRC connection configuration message. The first RRC connection configuration message includes the first experience quality information.

The receiver 901 is further configured to receive a first RRC connection configuration complete message sent by the UE after the UE completes configuration of the transmission channel.

The transmitter 903 is further configured to send a first bearer setup complete response message to the MME.

In the solution of this embodiment, UE can configure a transmission channel between a base station and the UE according to RRC connection configuration information that includes first experience quality information. Therefore, it can be ensured that all transmission channels from a network-side device to the UE can ensure an experience requirement of a service, so as to improve user experience.

Preferably, the foregoing described first experience quality information includes any one of the following:

an experience level of the first bearer; or an experience level required for transmitting the service by using the first bearer.

Further, the first experience quality information is an experience level determined by the network-side device according to a subscribed experience level of the UE and an experience level required for transmitting the service.

Optionally, the transmitter 903 is further configured to: if the base station does not accept the bearer setup request message, send an experience assurance negotiation request message to the MME. The experience assurance negotiation request message includes second experience quality information currently supported by the base station. The second experience quality information is an experience level determined by the base station according to a quality of service range supported by the base station.

The receiver 901 is further configured to: if the MME confirms that the second experience quality information meets the first experience quality information, receive an experience assurance negotiation response message sent by the MME.

The processor 902 is further configured to set up a second bearer that is used to transmit the service.

Further, the transmitter 903 is further configured to send a second RRC connection configuration message to the UE, to instruct the UE to configure the transmission channel according to the second RRC connection configuration message. The second RRC connection configuration message includes the second experience quality information.

The receiver 901 is further configured to receive a second RRC connection configuration complete message sent by the UE after the UE completes configuration of the transmission channel.

The transmitter 903 is further configured to send a second bearer setup complete response message to the MME.

It should be noted that a process in which the base station sets up the second bearer for transmitting the service is similar to a process in which the base station sets up the first bearer for transmitting the service, and an only difference between the processes is that setting up is performed according to different experience levels. Specific explanations and descriptions are similar to those in the foregoing embodiment, and details are not described herein again.

Preferably, the second experience quality information includes any one of the following:

an experience level of the second bearer; or an experience level required for transmitting the service by using the second bearer.

The base station provided based on the solution of this embodiment determines, according to a load status of the base station and first experience quality information, whether to accept a bearer setup request message, and may set up, according to a result of the determining and according to a corresponding experience level, a bearer for transmitting a service. The bearer set up in this way ensures an experience level for transmitting the service and further conforms to a current network status, so as to better ensure user experience.

It should be understood that, in this embodiment of the present invention, the processor may be a central processing unit (CPU for short), or the processor may be another general-purpose processor, a digital signal processor (DSP for short), an application-specific integrated circuit (ASIC for short), a field programmable gate array (FPGA for short) or another programmable logic device, a discrete gate or a transistor logic device, a discrete hardware component, or the like. The general-purpose processor may be a micro processor, or the processor may be any conventional processor, or the like.

In an implementation process, the foregoing steps may be completed by using an integrated logic circuit of hardware in the processor or an instruction in a form of software. The steps of the method disclosed with reference to the embodiments of the present invention may be directly performed and completed by a hardware processor, or performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in a memory, and the processor reads information from the memory and completes the steps of the foregoing method in combination with hardware of the processor. To avoid repetition, details are not described herein again.

Figure 10:
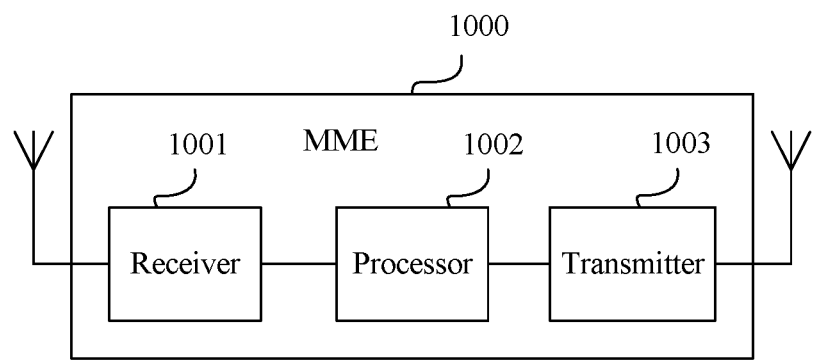
FIG. 10 is a schematic structural diagram of another MME according to an embodiment of the present invention.

The embodiments of the present invention further provide an MME. FIG. 10 is a schematic structural diagram of another MME according to an embodiment of the present invention. As shown in FIG. 10, the MME 1000 includes: a receiver 1001, a processor 1002, and a transmitter 1003.

The receiver 1001 is configured to receive a bearer setup request message sent by a PGW. The bearer setup request message is used to request to set up a bearer of a service, and the bearer setup request message includes first experience quality information. The first experience quality information is an experience level related to the service. The service is a service initiated by UE or a service initiated by a network-side device.

The transmitter 1003 is configured to send the bearer setup request message to a base station, so that if the base station accepts the bearer setup request message, the base station sets up a first bearer that is used to transmit the service.

The receiver 1001 is further configured to receive a bearer setup complete response message sent by the base station.

The MME provided in the solution of this embodiment may be implemented in cooperation with the base station described in the solution of the foregoing embodiments, to set up a bearer for transmitting the service. A specific implementation process and beneficial effects of setting up the bearer for transmitting the service are similar to those in the foregoing embodiments, and details are not described herein again.

Preferably, the first experience quality information includes any one of the following:

an experience level of the first bearer; or an experience level required for transmitting the service by using the first bearer.

Further, the first experience quality information is an experience level determined by the network-side device according to a subscribed experience level of the UE and an experience level required for transmitting the service.

Optionally, the receiver 1001 is further configured to: if the base station does not accept the bearer setup request message, receive an experience assurance negotiation request message sent by the base station. The experience assurance negotiation request message includes second experience quality information currently supported by the base station. The second experience quality information is an experience level determined by the base station according to a quality of service range supported by the base station.

The processor 1002 is configured to: if the second experience quality information meets the first experience quality information, determine that a second bearer that the base station requests to set up may be set up.

The transmitter 1003 is further configured to send an experience assurance negotiation response message to the base station, to instruct the base station to set up the second bearer for transmitting the service.

Preferably, the second experience quality information includes any one of the following:

an experience level of the second bearer; or an experience level required for transmitting the service by using the second bearer.

Further, the processor 1002 is further configured to: if the experience level included in the second experience quality information falls within a range of the experience level included in the first experience quality information, determine that the MME may set up the second bearer that the base station requests to set up.

The MME provided in this embodiment may cooperate with the base station provided in the foregoing embodiments, to set up a bearer for transmitting the service. Beneficial effects of setting up the bearer for transmitting the service are similar to those in the foregoing embodiments, and details are not described herein again.

It should be understood that, in this embodiment of the present invention, the processor may be a CPU, or the processor may be another general-purpose processor, a DSP, an ASIC, an FPGA or another programmable logic device, a discrete gate or a transistor logic device, a discrete hardware component, or the like. The general-purpose processor may be a micro processor, or the processor may be any conventional processor, or the like.

In an implementation process, the foregoing steps may be completed by using an integrated logic circuit of hardware in the processor or an instruction in a form of software. The steps of the method disclosed with reference to the embodiments of the present invention may be directly performed and completed by a hardware processor, or performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in a memory, and the processor reads information from the memory and completes the steps of the foregoing method in combination with hardware of the processor. To avoid repetition, details are not described herein again.

Figure 11:
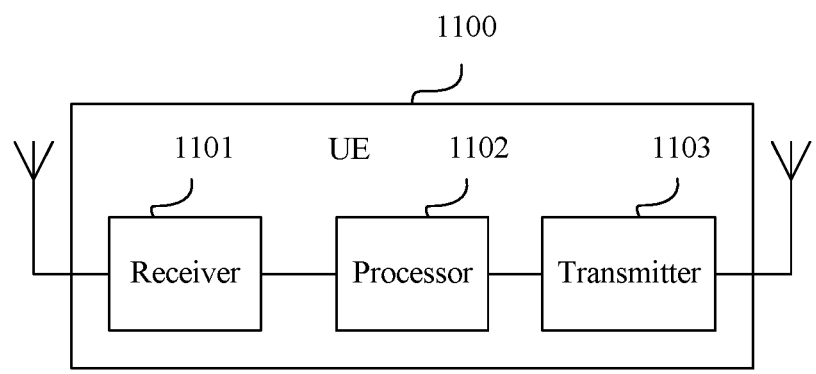
FIG. 11 is a schematic structural diagram of another UE according to an embodiment of the present invention.

The embodiments of the present invention further provide UE. FIG. 11 is a schematic structural diagram of another UE according to an embodiment of the present invention. As shown in FIG. 11, the UE 1100 includes: a receiver 1101, a processor 1102, and a transmitter 1103.

The receiver 1101 is configured to receive an RRC connection configuration message sent by a base station. The RRC connection configuration message is a message sent by the base station when the base station sets up a bearer, and the RRC connection configuration message includes experience quality information. The experience quality information is an experience level related to a service that the UE needs to transmit. The service is a service initiated by the UE, or a service initiated by a network-side device.

The processor 1102 is configured to configure a transmission channel according to the RRC connection configuration message.

The transmitter 1103 is configured to send an RRC connection configuration complete message to the base station, to indicate that a bearer between the base station and the UE has been set up.

Further, the RRC connection configuration message is a first RRC connection configuration message that is sent to the UE by the base station when the base station accepts a bearer setup request message sent by an MME. The first RRC connection configuration message includes first experience quality information. The established bearer is a first bearer.

Preferably, the first experience quality information includes any one of the following:

an experience level of the first bearer; or an experience level required for transmitting the service by using the first bearer.

In the foregoing solution, the first experience quality information is an experience level determined by the network-side device according to a subscribed experience level of the UE and an experience level required for transmitting the service.

Optionally, the RRC connection configuration message is a second RRC connection configuration message that is sent to the UE by the base station when the base station does not accept a bearer setup request message sent by an MME. The second RRC connection configuration message includes second experience quality information. The established bearer is a second bearer.

The second experience quality information is experience quality information determined by the base station according to a quality of service range supported by the base station.

Further, the second experience quality information includes any one of the following:

an experience level of the second bearer; or an experience level required for transmitting the service by using the second bearer.

The UE provided in this embodiment may cooperate with the base station and the MME provided in the foregoing embodiments, to set up a bearer for transmitting the service. Beneficial effects of setting up the bearer for transmitting the service are similar to those in the foregoing embodiments, and details are not described herein again.

It should be understood that, in this embodiment of the present invention, the processor may be a CPU, or the processor may be another general-purpose processor, a DSP, an ASIC, an FPGA or another programmable logic device, a discrete gate or a transistor logic device, a discrete hardware component, or the like. The general-purpose processor may be a micro processor, or the processor may be any conventional processor, or the like.

In an implementation process, the foregoing steps may be completed by using an integrated logic circuit of hardware in the processor or an instruction in a form of software. The steps of the method disclosed with reference to the embodiments of the present invention may be directly performed and completed by a hardware processor, or performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in a memory, and the processor reads information from the memory and completes the steps of the foregoing method in combination with hardware of the processor. To avoid repetition, details are not described herein again.

A person skilled in the art may be aware that, in combination with the embodiments disclosed in this specification, method steps and units may be implemented by using electronic hardware, computer software, or a combination thereof. To clearly describe the interchangeability between the hardware and the software, the foregoing has generally described steps and compositions of each embodiment according to functions. Whether the functions are performed in a hardware or software manner depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing-described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disc, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station, comprising:
a receiver, configured to receive a bearer setup request message sent by a mobility management entity (MME), wherein the bearer setup request message is used to request to set up a bearer of a service, the bearer setup request message comprises first quality information, the first quality information is a level related to the service, and the service is a service initiated by user equipment (UE) or a service initiated by a network-side device; and
a processor, configured to: determine, according to a current load status and the first quality information, whether the base station accepts the bearer setup request message, and when the base station accepts the bearer setup request message, set up a first bearer that is used to transmit the service; and
a transmitter, configured to send a first radio resource control (RRC) connection configuration message to the UE, to instruct the UE to configure a transmission channel according to the first RRC connection configuration message, wherein the first RRC connection configuration message comprises the first quality information;
wherein
the receiver is further configured to receive a first RRC connection configuration complete message sent by the UE after the UE completes configuration of the transmission channel; and
the transmitter is further configured to send a first bearer setup complete response message to the MME, and to send a second RRC connection configuration message to the UE, to instruct the UE to configure the transmission channel according to the second RRC connection configuration message, wherein the second RRC connection configuration message comprises the second quality information;
the receiver is further configured to receive a second RRC connection configuration complete message sent by the UE after the UE completes configuration of the transmission channel; and
the transmitter is further configured to send a second bearer setup complete response message to the MME.

2. The base station according to claim 1, wherein the processor is further configured to: determine, according to the first quality information, a network resource required by a bearer corresponding to the first quality information, and determine, according to the current load status, a network resource that can be currently provided; and when the network resource that can be currently provided is greater than or equal to the network resource required by the bearer corresponding to the first quality information, determine that the base station accepts the bearer setup request message; or when the network resource that can be currently provided is less than the network resource required by the bearer corresponding to the first quality information, determine that the base station does not accept the bearer setup request message.

3. The base station according to claim 1, wherein:
the transmitter is further configured to: when the base station does not accept the bearer setup request message, send an assurance negotiation request message to the MME, wherein the assurance negotiation request message comprises second quality information currently supported by the base station, and the second quality information is a level determined by the base station according to a quality of service range supported by the base station;
the receiver is further configured to: when the MME confirms that the second quality information meets the first quality information, receive an assurance negotiation response message sent by the MME; and
the processor is further configured to set up a second bearer that is used to transmit the service.

4. The base station according to claim 1, wherein the second quality information comprises any one of the following:
a level of the second bearer; or
a level required for transmitting the service by using the second bearer.

5. A mobility management entity (MME), comprising:
a receiver, configured to receive a bearer setup request message sent by a packet data network gateway (PGW), wherein the bearer setup request message is used to request to set up a bearer of a service, the bearer setup request message comprises first quality information, the first quality information is a level related to the service, and the service is a service initiated by a user equipment (UE) or a service initiated by a network-side device; and
a transmitter, configured to send the bearer setup request message to a base station, so that when the base station accepts the bearer setup request message, the base station sets up a first bearer that is used to transmit the service, wherein
the receiver is further configured to receive a bearer setup complete response message sent by the base station.

6. The MME according to claim 5, wherein
the first quality information is a level determined by the network-side device according to a subscribed level of the UE and a level required for transmitting the service.

7. A bearer setup method, comprising:
- receiving, by a base station, a bearer setup request message sent by a mobility management entity (MME), wherein the bearer setup request message is used to request to set up a bearer of a service, the bearer setup request message comprises first quality information, the first quality information is a level related to the service, and the service is a service initiated by a user equipment (UE) or a service initiated by a network-side device;
- determining, by the base station according to a current load status and the first quality information, whether to accept the bearer setup request message; and
- when the base station accepts the bearer setup request message, setting up, by the base station, a first bearer that is used to transmit the service, wherein the setting up, by the base station, a first bearer that is used to transmit the service comprises:
- sending, by the base station, a first radio resource control (RRC) connection configuration message to the UE, to instruct the UE to configure a transmission channel according to the first RRC connection configuration message, wherein the first RRC connection configuration message comprises the first quality information;
- receiving, by the base station, a first RRC connection configuration complete message sent by the UE after the UE completes configuration of the transmission channel; and
- sending, by the base station, a first bearer setup complete response message to the MME.

8. The method according to claim 7, wherein the determining, by the base station according to a current load status and the first quality information, whether to accept the bearer setup request message comprises:
- determining, by the base station according to the first quality information, a network resource required by a bearer corresponding to the first quality information, and determining, according to the current load status, a network resource that can be currently provided; and
- when the network resource that can be currently provided is greater than or equal to the network resource required by the bearer corresponding to the first quality information, determining, by the base station, to accept the bearer setup request message; or when the network resource that can be currently provided is less than the network resource required by the bearer corresponding to the first quality information, determining, by the base station, not to accept the bearer setup request message.

* * * * *